(12) United States Patent
Jiang et al.

(10) Patent No.: US 6,535,723 B1
(45) Date of Patent: Mar. 18, 2003

(54) METHOD OF POWER CONTROL FOR A WIRELESS COMMUNICATION SYSTEM HAVING MULTIPLE INFORMATION RATES

(75) Inventors: Frances Jiang, Whippany, NJ (US); Raafat Edward Kamel, Westfield, NJ (US); Quinn Li, Madison, NJ (US); Alexandro Federico Salvarani, Edison, NJ (US); Carl Francis Weaver, Hanover Township, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/267,998

(22) Filed: Mar. 15, 1999

(51) Int. Cl.$^7$ .................................. H04B 1/06
(52) U.S. Cl. ............... 455/245.1; 455/24; 455/67.3; 455/69
(58) Field of Search ............... 455/422, 423, 455/424, 13.4, 38.3, 501, 504, 517, 522, 63, 67.3, 69, 67.1–67.4, 226.1–226.3, 232.1–245.2; 370/465–468

(56) References Cited

U.S. PATENT DOCUMENTS

| | | | |
|---|---|---|---|
| 5,193,223 A | * | 3/1993 | Walczak et al. ............. 455/115 |
| 5,345,598 A | * | 9/1994 | Dent ......................... 455/54.1 |
| 5,551,057 A | * | 8/1996 | Mitra ......................... 455/522 |
| 5,553,316 A | * | 9/1996 | Diepstraten et al. .......... 455/69 |
| 5,574,984 A | * | 11/1996 | Reed et al. ................... 455/69 |
| 5,634,195 A | * | 5/1997 | Sawyer ....................... 455/522 |
| 5,634,206 A | * | 5/1997 | Reed et al. .................. 455/504 |
| 5,710,981 A | * | 1/1998 | Kim et al. ..................... 455/69 |
| 5,715,526 A | * | 2/1998 | Weaver, Jr. et al. ......... 455/126 |
| 5,812,938 A | * | 9/1998 | Gilhousen et al. ............. 455/69 |
| 5,841,806 A | * | 11/1998 | Gilhousen et al. .......... 375/206 |
| 5,987,333 A | * | 11/1999 | Sole ........................... 455/522 |
| 6,181,738 B1 | * | 1/2001 | Chheda et al. .............. 375/224 |

* cited by examiner

*Primary Examiner*—Edward F. Urban
*Assistant Examiner*—Charles Craver
(74) *Attorney, Agent, or Firm*—Law Offices of John Ligon

(57) ABSTRACT

A method of controlling the power in a wireless communication system. In one embodiment of the invention, a base station determines the information rate of a signal to be transmitted to a mobile station, and obtains the variable power control scaling factor based on this information rate. The base station then transmits the variable power control scaling factor to the mobile station. The mobile station determines a target signal quality measurement for a received signal from the base station, such as a target $E_b/N_0$, and scales the target $E_b/N_0$ by the variable power control scaling factor. The mobile station also obtains an information rate scaling factor based on the information rate of the received signal, and further scales the target $E_b/N_0$ by this information rate scaling factor. The mobile station then compares the target $E_b/N_0$ to a measured $E_b/N_0$ of the received signal. An increase in power of the received signal is requested when the measured $E_b/N_0$ of the received signal is smaller than the scaled $E_b/N_0$. A decrease in power of the received signal is requested when the measured $E_b/N_0$ of the received signal is larger than the scaled $E_b/N_0$. Providing the variable power control scaling factor to the mobile station allows frames having an information rate lower than the full rate to be transmitted at a power even lower than the power of a frame having an information rate equal to the full rate times the information scaling factor.

19 Claims, 3 Drawing Sheets

METHOD OF POWER CONTROL FOR A WIRELESS COMMUNICATION SYSTEM HAVING MULTIPLE INFORMATION RATES

FIELD OF THE INVENTION

The present invention relates generally to wireless communications systems and, in particular, to power control in wireless communications systems having multiple information rates.

BACKGROUND OF THE INVENTION

Wireless communications systems use power control to improve system performance and increase system capacity. Power control involves tracking possible fading of communication channels and using that tracked fading to manage the power at which signals are being transmitted from base stations (in order to compensate for the fading). Conventional Code Division Multiple Access (CDMA) wireless communications systems based on the well-known IS-95 standard use error indicator bits to assist in controlling transmission power at the base station. Power control is implemented in the following manner.

When a call is set up in a CDMA wireless communications system, a base station and a mobile station communicate over a forward and a reverse link. The forward link includes communication channels for transmitting signals from the base station to the mobile station and the reverse link includes communication channels for transmitting signals from the mobile station to the base station. The base station transmits control information to the mobile station over a communication channel referred to herein as a forward control channel, and the mobile station transmits control information to the base station over a communication channel referred to herein as a reverse control channel. The base station transmits voice or data to the mobile station over a communication channel referred to herein as a forward traffic channel, and the mobile station transmits voice or data to the base station over a communication channel referred to herein as a reverse traffic channel. In either traffic, channel, voice or data is transmitted over 20 milli-seconds (ms) time intervals referred to herein as frames.

A set number of voice or data bits are transmitted within each frame, typically reported as the number of bits transmitted per second, referred to herein as a channel rate. The channel rate does not change and is typically dependent on the rate of the coder in the system, i.e. the rate of the speech or data coder. However, the amount of information within each frame of the signal does change, particularly for voice signals. Therefore the number of bits of information transmitted per second, referred to herein as the information rate, can change.

Four different information rates are possible in the traffic channel: full rate, ½ rate, ¼ rate and ⅛ rate. At the full rate the information rate and the channel rate are a equal. The information rate of the forward traffic channel is at the full rate when a large amount of information is being transmitted from the base station to the mobile. The information rate of the forward traffic channel is at the ⅛ rate when a small amount of information is being transmitted from the base station to the mobile. The ½ and the ¼ rate are transitional rates. For example, in a telephone conversation between a mobile station user and a second user communicating with the mobile station user, a voice signal from the second user is transmitted to the base station, which transmits it to the mobile station over the forward traffic channel. During a part of the conversation, the second user is talking. Therefore, the information rate of the forward traffic channel would be high because a large amount of information is being transmitted on the forward traffic channel. In this case, the information rate would be the full rate. During another part of the conversation, the second user is listening. Therefore, the information rate of the forward traffic channel would be low because a small amount of information is being transmitted on the forward traffic channel. In this case, the information rate would be equal to the ⅛ rate.

When the information rate is ½, ¼, or ⅛, the channel rate is higher than the information rate, and the information is repeated several times per frame. For example, with the ½ rate information is repeated twice each frame; with the ¼ rate the information is repeated four times per frame; and with the ⅛ rate the information is repeated eight times per frame. Repeating the information several times per frame permits the information to be transmitted at a correspondingly lower power. The power is scaled by an information rate scaling factor, which is equal to the information rate. For a frame whose information rate is equal to the ⅛ rate, the information rate scaling factor is ⅛, and the power can be reduced to ⅛ of the power of the frame at the full rate.

The bits in the frame are spread in time, referred to herein as interleaved. Interleaving typically spreads out important bits in time so that if there is a deep fade or noise burst the important bits are not corrupted by one deep fade or noise burst. This reduces the number of frames containing errors, referred herein as a frame error rate.

When system conditions are equal, frames that have an information rate lower than the channel rate have a lower frame error rate than frames whose information rate is equal to the full rate. This is due to the synergistic effects of combining interleaving with the repeating of the bits in the frame. The lower frame error rate of the frames having the lower information rate allows these frames to be transmitted at an even lower power. For example, for a frame whose information rate is ⅛, the power can be reduced to below ⅛ the power of a frame whose information rate is the full rate. The base station can adjust the power of a frame having an information rate lower than the full rate.

Referring to FIG. 1, in conventional CDMA systems, each forward traffic frame 10 (i.e., frames transmitted over the forward traffic channel) includes voice or data and error control information, typically in the form of a cyclical redundancy code (CRC). By contrast, each reverse traffic frame 20 (i.e., frames transmitted over the reverse traffic channel) includes voice or data and error indicator bits (EIB) for indicating whether the last forward traffic frame is a good frame or in erasure, i.e., a bad frame.

When base station 30 transmits forward traffic frame 10, mobile station 40 receiving forward traffic frame 10 will check the CRC to determine whether forward traffic frame 10 is good or not. Mobile station 40 will indicate such determination to base station 30 using the EIB in the next reverse traffic frame the mobile station will transmit. For example, a zero error indicator bit indicates no error in the forward traffic frame, and a positive error indicator bit indicates the forward traffic frame is a bad frame. Upon receiving reverse traffic frames from the mobile station, the base station examines the EIB and determines whether its forward link to the mobile station is in fading, and adjusts the power of its forward link accordingly. For example, if the base station receives one or more successive EIB, denoting erred forward traffic frames, the base station may determine that its forward link is in fading and increase the power of its forward link. This is to ensure that the frame error rate is kept to an acceptable percentage, typically between 1% and 3%, depending on the desired system performance.

Therefore, in a conventional CDMA wireless, communications system, a power control decision to either adjust the power or keep the power at its current level occurs once every frame, when the EIB is received. In newly proposed CDMA wireless communications system (hereinafter referred to as CDMA 2000), the forward link power control is much faster. The forward link power control is at 800 Hz rate, which means that power control information, referred to herein as a power control bit, is sent every 1.25 ms, or once for every power control group. Therefore, the base station cannot wait until the end of the forward traffic frame to determine if the power should be adjusted. Referring to FIG. 2, in CDMA 2000 power control is effected using slow outer loop 100 and fast inner loop 110. In outer loop 100 mobile station 120 determines a target signal to noise ratio using target frame error rate 124, which is typically between 1% and 3%, depending on the desired system performance. Signal to noise ratios are often expressed as the ratio $E_b/N_0$, where $E_b$ is the energy per information bit and $N_0$ is the power spectral density of the interference seen by the receiver. Thus, target $E_b/N_0$ 130 can be used for the target signal to noise ratio. Target $E_b/N_0$ 130 is determined for each frame. Thus, for a 20 ms frame the speed of the outer loop is 50 Hz. After target $E_b/N_0$ 130 is determined, it is passed to inner loop 110. In inner loop 110, target $E_b/N_0$ 130 is compared to measured $E_b/N_0$ 160 of the received signal, which is measured for the 1.25 ms since the last comparison. When measured $E_b/N_0$ 160 is smaller than target $E_b/N_0$ 130 the mobile station 120 requests an increase in power. When measured $E_b/N_0$ 160 is larger than target $E_b/N_0$ 130 the mobile station 120 requests a decrease in power.

A problem with this system is that it does not allow frames whose information rate is lower than the channel rate to be transmitted at lower power than the full rate power scaled by the information rate scaling factor. For example, for a particular system, a frame having an information rate equal to the ⅛ rate transmitted at 1/16 the power of a frame at full rate may have an acceptable frame error rate, and because the information rate is ⅛ the target $E_b/N_0$ 130 will be ⅛ of a target $E_b/N_0$ 130 when the information rate is equal to the full rate. Base station 180 will transmit a frame having an information rate of ⅛ at 1/16 the power of a frame at a full rate, which will produce a measured $E_b/N_0$ of about ½the target $E_b/N_0$ 130. Mobile station 120 receives the bits in the first 1.25 ms of the frame, and measures the $E_b/N_0$ of these bits. Mobile station 120 then compares this measured $E_b/N_0$ to the target $E_b/N_0$ 130. Because target $E_b/N_0$ 130 is larger than the measured $E_b/N_0$, the mobile station will continue requesting an increase in power until the frame is being transmitted at ⅛ the power of a frame at full rate, therefore eliminating the reduction in power that was available due to the synergistic effects of combining interleaving with the repeating of the bits in the frame.

SUMMARY OF THE INVENTION

The invention solves the above problems by providing a variable power control scaling factor to the mobile station. The mobile station determines a target signal quality measurement for transmitting a signal, and scales this target signal quality measurement by the variable power control scaling factor. Providing the variable power control scaling factor to the mobile station allows frames having an information rate lower than full rate to be transmitted at a power even lower than the information scaling factor times the power of the frame having an information rate equal to the full rate.

In another embodiment of the invention, the base station determines an information transmission rate of a signal to be transmitted. The base station then obtains a variable power control scaling factor based on the information transmission rate, and transmits the variable power control scaling factor.

DETAILED DESCRIPTION

Figure 1:
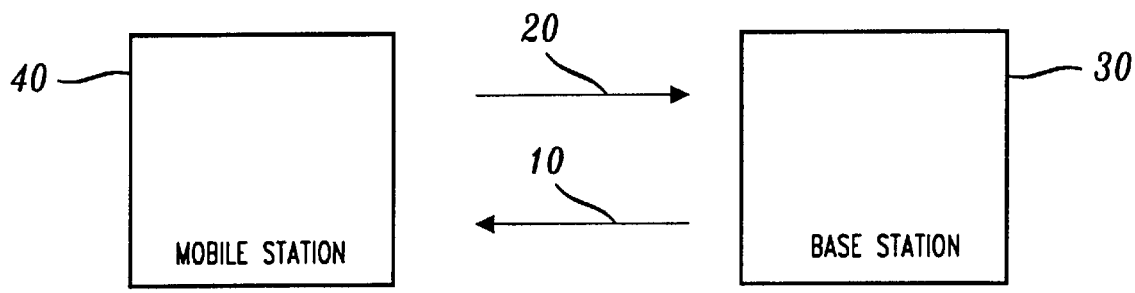
FIG. 1 illustrates power control in a conventional CDMA system.
Figure 2:
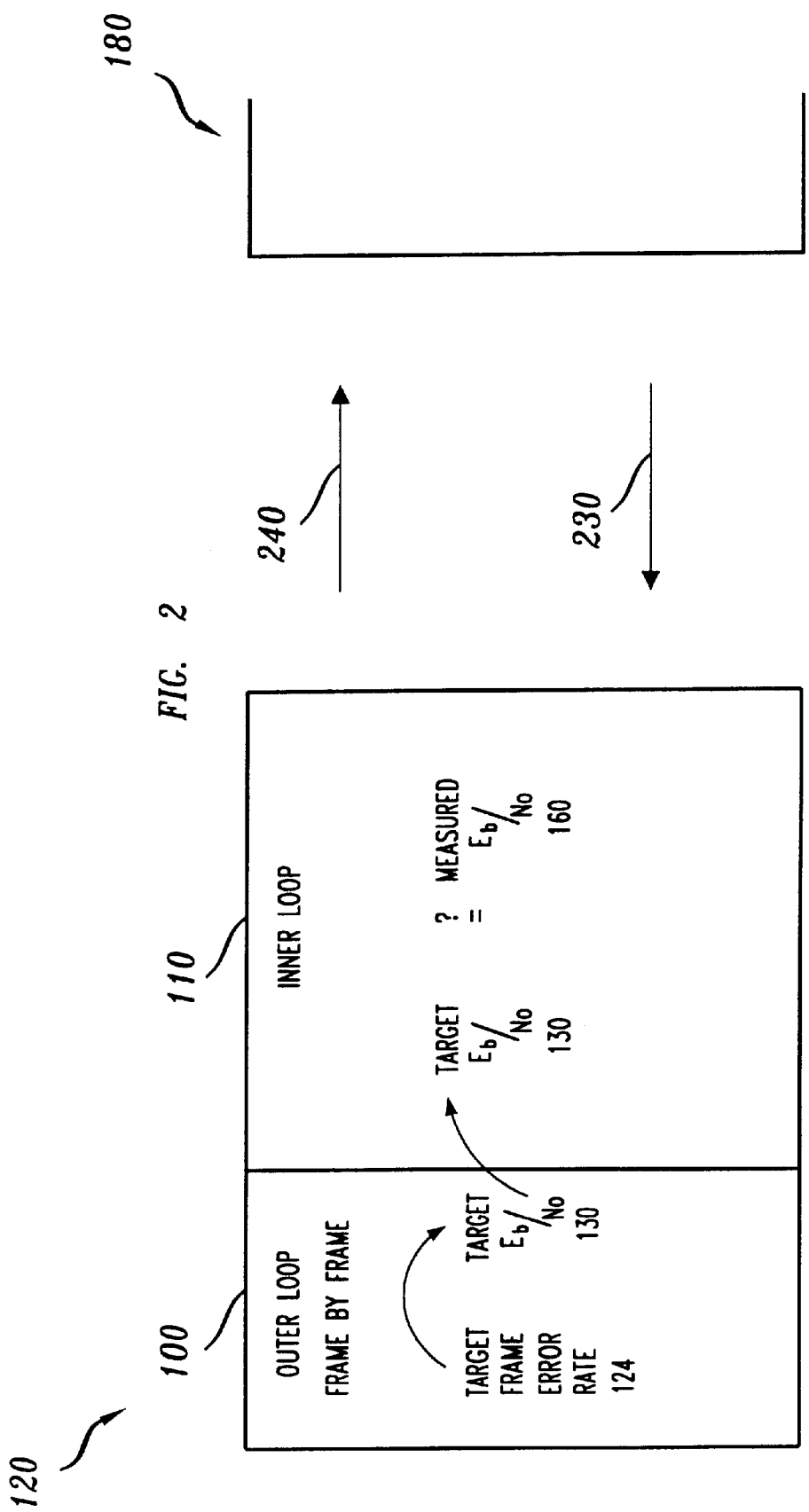
FIG. 2 illustrates power control in a CDMA 2000 system.
Figure 3:
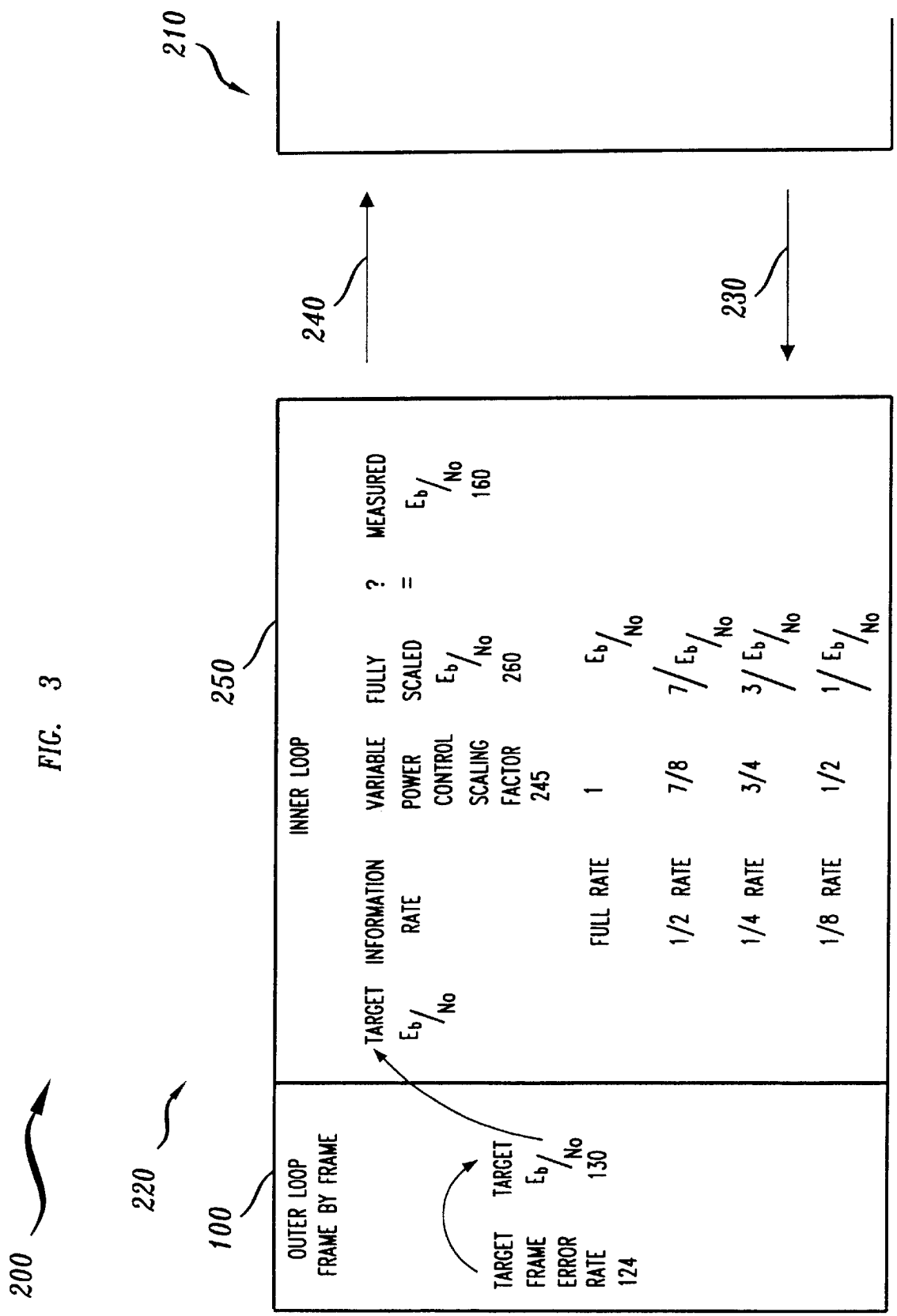
FIG. 3 illustrates power control using a variable power control scaling factor in a CDMA 2000 system.

FIG. 3 illustrates a wireless communication system 200 having base station 210 and mobile station 220 used in accordance with the present invention. Base station 210 and mobile station 220 communicate using forward link 230 and reverse link 240 employing well-known Code Division Multiple Access (CDMA) 2000 techniques. This should not be construed to limit the present invention to base stations and mobile stations employing CDMA 2000 techniques. The present invention may equally be applicable to base stations and mobile stations employing other CDMA techniques and other multiple access techniques.

Each forward traffic frame (i.e., frames transmitted over the forward traffic channel) includes voice or data, and error control information, typically in the form of a cyclical redundancy code (CRC). Variable power control scaling factor 245 can also be transmitted on the forward traffic channel. As explained above, the information content of the forward traffic frames can have different information rates. Typically, there are four information rates full rate, ½ rate, ¼ rate, and ⅛ rate. When the information rate of a frame is lower than the channel rate, the frame can be transmitted at a power that is even lower than the power of a frame having an information rate equal to the full rate times the information rate scaling factor. The factor by which the power of the frame having the lower information rate can be reduced and still have an acceptable frame error rate is the variable power control scaling factor. The variable power control scaling factor is based on system conditions such as the mobility of the system, the typical number of users in the system, the size of areas covered by base stations in the system referred to hereinafter as cells, the interference in the system from buildings or other objects, and any other factors that determine the amount of power needed to maintain an acceptable frame error rate. Furthermore, because these conditions can vary from cell to cell, each base station can determine its own variable power control scaling factor. The variable power control scaling factor 245 can be empirically obtained in drive test. In a typical system, variable power control scaling factor 245 can be: about 1 for frames having an information rate equal to the full rate; about ⅞ for frames having an information rate equal to the ½ rate; about ¾ for frames having an information rate equal to the ¼ rate; and about ½ for frames having an information rate equal to the ⅛ rate.

The variable power control scaling factor can be transmitted as part of any of the messages of the forward traffic channel, such as a handoff direction message or a power control parameter message. Alternatively, the base station can transmit the variable power control scaling factor as a message on any of the control channels, for example as a message on the paging channel. Preferably, variable power control scaling factor 245 is in a system parameter message or channel assignment message of the paging channel. Although the variable power control scaling factor is being described with reference to the forward link this should not be construed to limit the present invention to power control on the forward link. The present invention may be applicable to power control on the reverse link.

Each reverse traffic frame (i.e., frames transmitted over the reverse traffic channel) includes voice. However, the power control bits are now transmitted on the reverse pilot channel. Each frame of the reverse pilot channel comprises sixteen 1.25 ms time intervals referred to herein as power control groups, each including power control bits for indicating whether the transmit power should be increase or decreased based on the last forward traffic power control group.

In wireless communication system 200, power control of the forward link is effected using slow outer loop 100 and fast inner loop 250. In outer loop 100 mobile station 220 determines a target signal quality measurement, preferably target $E_b/N_0$ 130, using target frame error rate 124, which is typically between 1% and 3%, depending on the desired system performance. The signal quality measurement can be any measurement that indicates the quality of the signal received from base station 210 by mobile station 220. Preferably, the signal quality measurement is either the signal to noise ratio or the $E_b/N_0$, which is often used to express the signal to noise ratio. Target $E_b/N_0$ 130 is determined for each frame. After target $E_b/N_0$ 130 is determined, it is passed to inner loop 250. In inner loop 250, target $E_b/N_0$ 130 is scaled by variable power scaling factor 245 to produce scaled target $E_b/N_0$ 260. Scaled target $E_b/N_0$ 260 is compared to measured $E_b/N_0$ 160 of the received signal, which is measured for the 1.25 ms since the last comparison. When measured $E_b/N_0$ 160 is smaller than scaled target $E_b/N_0$ 260 the mobile station 220 transmits information indicating that power should be increased. Base station 210 responds to this request by increasing the power of the forward traffic channel. When measured $E_b/N_0$ 160 is larger than scaled target $E_b/N_0$ 260 the mobile station 220 transmits information indicating that power should be decreased. Base station 210 responds to this request by decreasing the power of the forward traffic channel.

Wireless communication system 200 allows frames whose information rate is lower than the channel rate to be transmitted at lower power than the power of a frame having an information rate equal to the full rate, scaled by the information rate scaling factor. For example, when the variable power scaling factor is ½ for a frame having an information rate of ⅛, the base station transmits the frame at ¹⁄₁₆ the power of a frame having an information rate equal to the full rate. This will produce a measured $E_b/N_0$ of about ½ the target $E_b/N_0$ 130. Mobile station 220 receives the bits in the first 1.25 ms of the frame, and measures the $E_b/N_0$ of these bits. Mobile station 220 then compares this measured $E_b/N_0$ to the scaled target $E_b/N_0$ 260. Because information rate scaling factor 140 is ⅛ the target $E_b/N_0$ 130 is ⅛ of the $E_b/N_0$ 130 of a frame whose information rate is equal to the full rate. Since variable power control scaling factor 245 is ½, the scaled target $E_b/N_0$ 260 is ½ of target $E_b/N_0$ 130. When there is no fading or noise bursts the measured $E_b/N_0$ and the scaled $E_b/N_0$ are about equal. The mobile station will not request a change in power, therefore allowing the system to use the reduction in power available due to the synergistic effects of combining interleaving with the repeating of the bits in the frame.

Variable power control scaling factor can also be used in the power control of the reverse link. The base station determines a target signal quality measurement for a received signal on the reverse link. The base station would also obtain a variable power control scaling factor, and then scale the target signal quality measurement by the variable power control scaling factor. Scaled target signal quality measurement is compared to measured signal quality measurement of the received signal. When measured signal quality measurement is smaller than scaled target signal quality measurement the base station request that the mobile station increase the transmit power. When measured signal quality measurement is larger than scaled target signal quality measurement the base station requests that the mobile station decrease the transmit power.

While the invention has been described with reference to a preferred embodiment, it will be understood by those skilled in the art having reference to the specification and drawings that various modifications may be made and various alternatives are possible therein without departing from the spirit and scope of the invention.

We claim:

1. A method for controlling the power in a wireless communication system, the method comprising the steps of:

determining a target value of a signal quality parameter to achieve a required signal quality for a full information rate frame of data of a received signal;

determining a target value of the signal quality parameter for a fractional information rate frame of the received signal as a proportional adjustment to the full-rate target value, the proportional adjustment being a function of a fraction the fractional information rate frame bears to the full information rate;

adjusting the fractional-rate target value by a variable power control scaling factor, wherein the variable power control scaling factor represents a fraction by which the fractional-rate target value can be reduced while maintaining the required signal quality for the frame; and evaluating a received value of the signal quality parameter for ones of power control groups in frames transmitted at the fractional information rate against the adjusted fractional-rate target value.

2. The method of claim 1, wherein the signal quality value is a signal to noise ratio.

3. The method of claim 1, wherein the signal quality value is an $E_b/N_o$.

4. The method of claim 1, wherein the evaluating step further comprises the steps of:

measuring a signal quality value of the received signal;

comparing the measured signal quality value of the received signal to the scaled target signal quality value;

requesting an increase in power of the received signal responsive to the measured signal quality value of the received signal being smaller than the scaled target signal quality value; and requesting a decrease in power of the received signal responsive to the measured signal quality value of the received signal being larger than the scaled target signal quality value.

5. The method of claim 1, wherein the variable power control scaling factor is received in a message of the paging channel.

6. The method of claim 1, wherein the variable power control scaling factor is received in a message of the traffic channel.

7. The method of claim 1, wherein the scaling step operates on ones of power control group intervals in the frame.

8. A method for controlling transmitter power in a wireless system, the method comprising the steps of:

determining a target value of a signal quality parameter to achieve a required signal quality for a full information rate frame of data of a received signal;

determining a target value of the signal quality parameter for a fractional information rate frame of the received signal as a proportional adjustment to the full-rate target value, the fractional-rate target value being proportional to the full-rate target value in the proportion that the fractional information rate bears to the full information rate;

determining a variable power control scaling factor representing a factor by which the fractional-rate target value can be reduced while maintaining a required signal quality at the fractional information frame rate;

scaling the target signal quality parameter value for the fractional information rate by the variable power control scaling factor;

adjusting transmitter power for a power control interval in a fractional information rate frame as a function of a difference between a service quality parameter value measured for that interval and the scaled target signal quality parameter value.

9. The method of claim 8, wherein the variable power control scaling factor is transmitted in a message of the forward control channel.

10. The method of claim 8, (wherein the variable power control scaling factor is transmitted in a message of the paging channel.

11. The method of claim 8, wherein the variable power control scaling factor is transmitted in a message of the forward traffic channel.

12. The method of claim 11, wherein the forward traffic channel is a handoff direction message.

13. The method of claim 8, further comprising the step of scaling the transmitter power by the variable power control factor.

14. In a wireless communication system wherein information signals are transmitted at a full and one or more fractional information rates, and wherein target values of a signal quality parameter needed to achieve a specified signal quality are provided for a full-rate information frame and for at least one fractional-rate information frame, the fractional-rate target value being proportional to the full-rate target value in the proportion that the fractional information rate bears to the full information rate, a method for controlling transmission power in the wireless communication system comprising the steps of:

adjusting the fractional-rate target value by a variable power control scaling factor, wherein the variable power control scaling factor represents a fraction by which the fractional-rate target value can be reduced while maintaining a required signal quality for the frame; and evaluating a received value of the signal quality parameter for ones of power control groups in frames transmitted at the fractional information rate against the adjusted fractional-rate target value.

15. The method of claim 14, wherein the signal quality value is a signal to noise ratio.

16. The method of claim 14, wherein the signal quality value is an $E_b/N_o$.

17. The method of claim 14, wherein the evaluating step further comprises the steps of:

requesting an increase in power of the received signal responsive to the received value of the signal quality parameter being smaller than the adjusted fractional-rate target value; and requesting a decrease in power of the received signal responsive to the received value of the signal quality parameter being larger than the adjusted fractional-rate target value.

18. The method of claim 14, wherein the variable power control scaling factor is received in a message of the reverse pilot channel.

19. The method of claim 14, wherein the scaling step operates on ones of power control group intervals in the frame.

* * * * *